June 18, 1968  L. S. ROBERTS  3,388,796
TIRE PIERCING APPARATUS
Filed Sept. 16, 1965  6 Sheets-Sheet 4

INVENTOR.
LEROY S. ROBERTS
BY Joseph Januszkiewicz
ATTY.

Fig.11

# United States Patent Office 3,388,796
Patented June 18, 1968

3,388,796
TIRE PIERCING APPARATUS
Leroy S. Roberts, Miami, Okla., assignor to The B. F. Goodrich Company, New York, N.Y., a corporation of New York
Filed Sept. 16, 1965, Ser. No. 487,817
14 Claims. (Cl. 209—82)

ABSTRACT OF THE DISCLOSURE

A tire piercing apparatus having a support cooperative with a centering mechanism which preconditions a sorting device and centers tires of different sizes for clamping onto a table support, such that a plurality of tire sidewall piercing means are cooperative with the clamping means to pierce the sidewall portions of the tire to controlled depth. Thereafter, the tire is conveyed away and sorted according to size.

---

This invention relates to a tire piercing and sorting apparatus and more particularly to an improved apparatus for sorting tires according to size in cooperation with means for piercing the sidewalls of a vulcanized rubber vehicle tire to a predetermined depth to vent trapped air or trapped adhesive solvent vapor from between adjacent plies of rubber and rubberized cord fabric.

In the mass manufacture of vehicle tires it has been learned that air or adhesive solvent vapor becomes entrapped between the plies of the tire posing a serious problem. Although such gases are confined in a relatively small pocket, such gases will tend to collect or localize through a wicking action of the fabric cord towards the bead of the tire. Upon heating up of such gases due to heat build-up during high speed tire operation, the gases will expand to cause destructive ply separation or possible blowouts.

While partial solution has been effected through the use of (1) pricked elastomeric cord fabric which facilitates the escape of the gases out from between layers, and (2) through the use of progressive stitching from the central region of the carcass towards the beads, sufficient gases frequently remain to cause ply separation and blowouts.

To assure a complete removal of the trapped gases, it has then been suggested to pierce the sidewalls of the vulcanized tire to provide a positive escape for any trapped gases. Hand piercing is unsatisfactory because of the time-consuming nature of the operation and the costs involved. Apparatus designed to provide automatic awling or piercing of the sidewall tire have been limited practically in the mass production of such tires. Heretofore, such piercing apparatus had a limitation on the number of holes pierced as well as in their flexibility of use. The present invention is an improvement over known automatic tire piercers by providing greater flexibility in handling of tires of various sizes, providing the gauging of a tire, pre-conditioning the sorting means, and thence providing for the rapid piercing wherein a sufficient number of pierced passages are effected to assure complete removal of the gases. The result achieved by this invention assures controlled accurate piercing by an apparatus which has relatively few movable parts cooperative to achieve high efficiency in the handling thereof.

Briefly, the invention comprises a support cooperative with a centering mechanism which centers tires of variable size for clamping onto a table and preconditions the sorting device. A plurality of rotary piercing means are cooperative with movable clamping means to pierce the sidewall portion of the tire to controlled depth, after which such tire is sized and discharged into the proper bin.

An object of this invention is to provide a new and improved tire sidewall piercing apparatus.

A further object of this invention is to provide a new and improved apparatus for coordinating the piercing and sorting of tires.

A further object of this invention is to provide a new and improved means for sorting tires in conjunction with the centering of tires for a piercing operation.

A further object of this invention is to provide a new and improved apparatus which rapidly and accurately pierces a plurality of holes into the sidewall of a tire to permit the escape of gases trapped within the carcass thereof.

Another object of this invention is to provide a novel tire sidewall piercer which handles a plurality of sizes of tires efficiently and accurately.

Another object of this invention is to sort a plurality of sizes of tires efficiently and accurately.

Another object of this invention is to simultaneously sort a plurality of tire sizes in cooperation with the tire piercing operation.

Other objects and advantages of the invention will hereinafter become more fully apparent from the following description of the annexed drawings, which illustrate a preferred embodiment, and wherein:

Figures 1A, 1B:
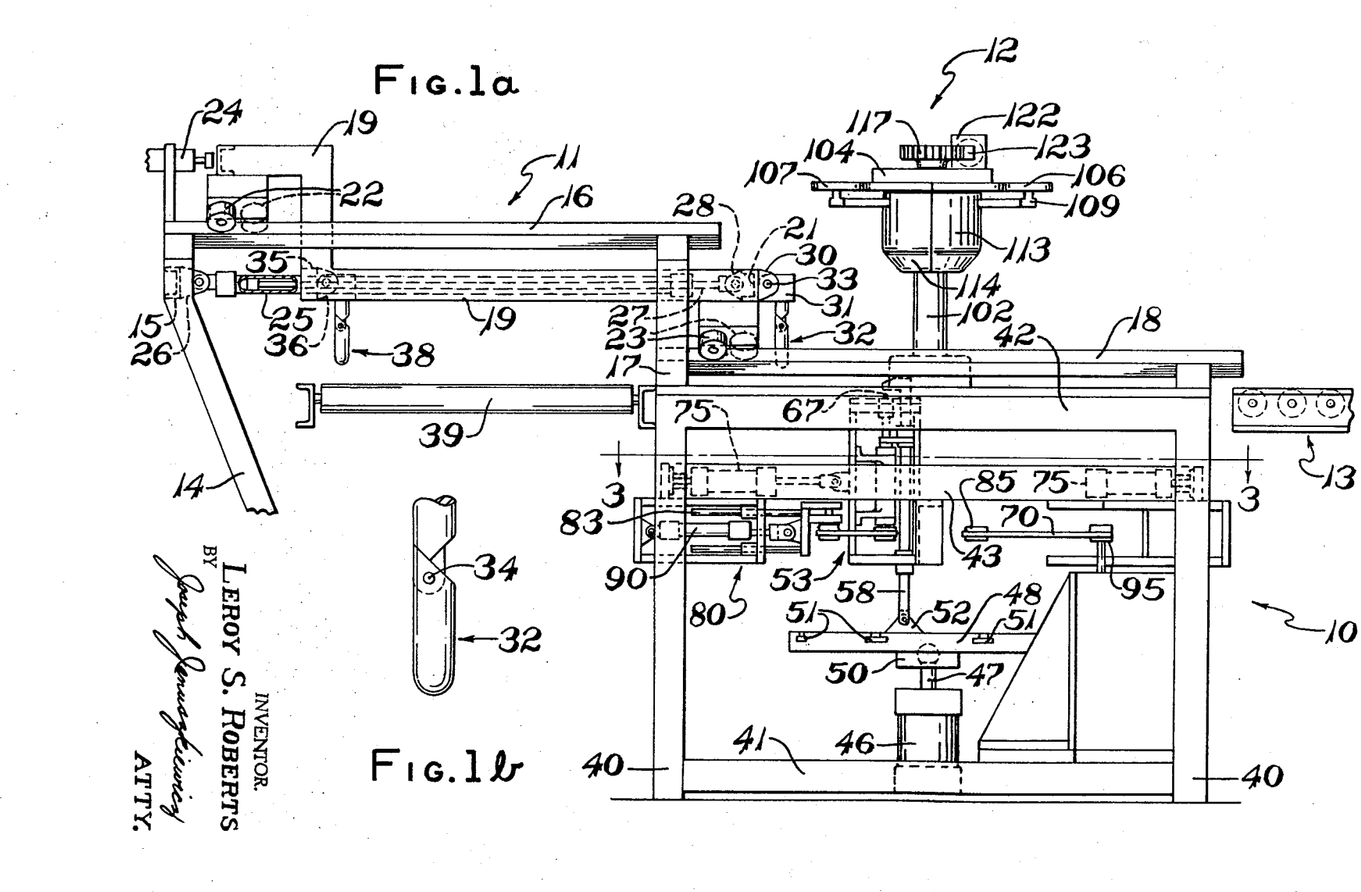
FIG. 1a is a front elevational view of a preferred embodiment of the invention.
FIG. 1b is an enlarged view of the double pivot pusher.

Referring now to the drawings, wherein like reference characters designate like or corresponding parts throughout the several views, there is shown in FIG. 1a a tire piercing apparatus 10, a feed mechanism 11, a tire sorter and centering device 12, and a discharge conveyor 13.

Figure 2:
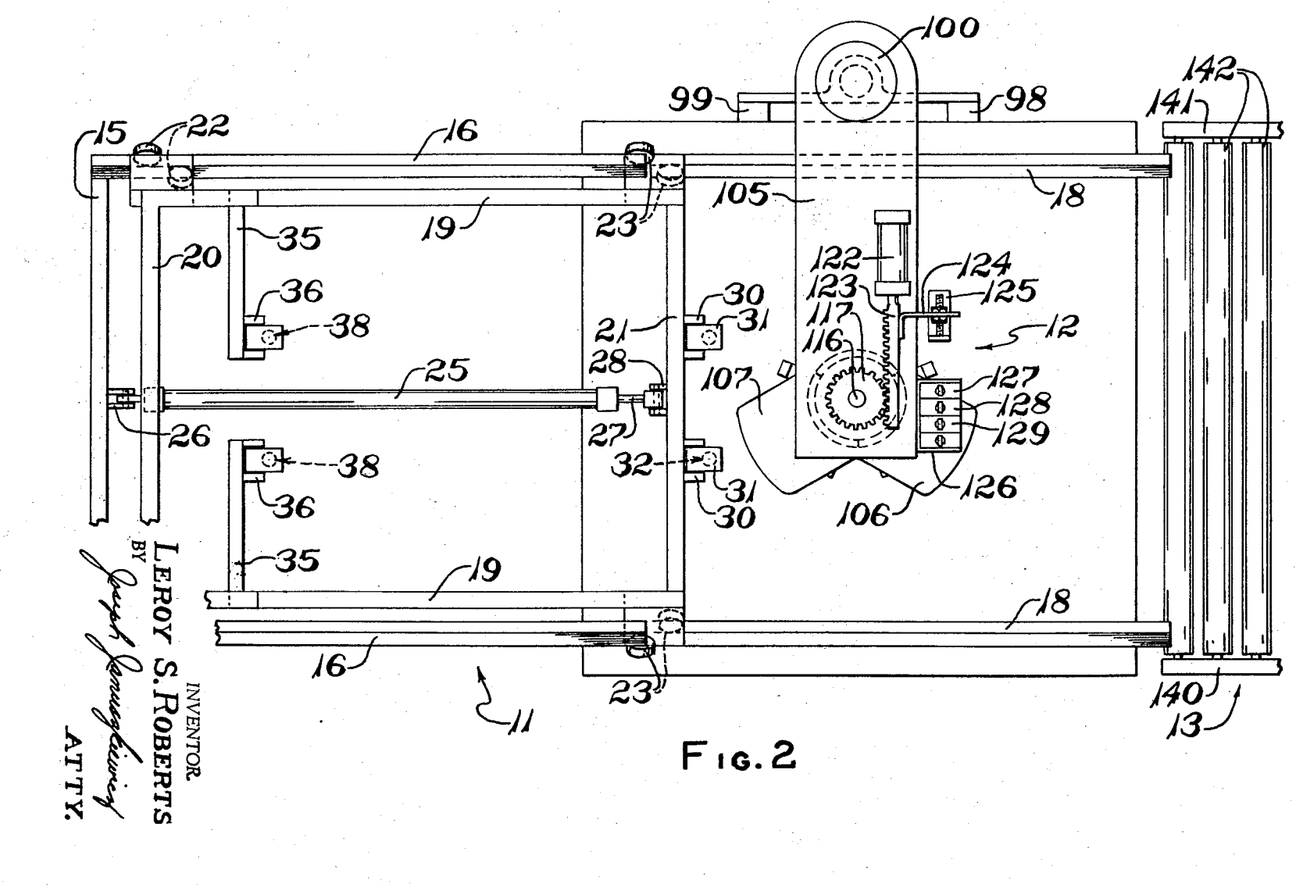
FIG. 2 is a plan view of the apparatus shown in FIG. 1 with details omitted to show the centering means in relation to the inlet and discharge conveyor and without the hydrocheck device.

The feed mechanism 11 as shown in FIGS. 1a and 2 comprises a support frame structure 14 having a cross bar 15, and a pair of longitudinally extending parallel guide rails 16—16. Each rail 16 has one end connected to the cross bar 15 and the other end connected to a bracket 17 which is mounted on the support frame structure of the tire piercing apparatus 10 as shown in FIG. 1a. Tire piercing apparatus 10 supports a pair of guide rails 18—18 parallel to the guide rails 16—16 but non-coplanar therewith.

Slidably mounted on guide rails 16—16 and guide rails 18—18 is a carriage comprising a pair of stepped shaped side brackets 19—19 (FIG. 1a) which are connected at their respective ends by a pair of spaced laterally extending end brackets 20 and 21 (FIG. 2). The respective side brackets 19—19 have pairs of guide rollers 22 and 23 journalled thereon to facilitate the longitudinal movement of such carriage over such guide rails. A pneumatic cylinder 25 has its cylinder end pivotally connected by a bracket 26 to the crossbar 15 and its piston rod 27 pivotally connected to a pair of spaced brackets 28—28 (FIG. 2) which are fixed to the end bracket 21. Also mounted on end bracket 21 are two pairs of spaced brackets 30 which pivotally support the upper end portion 31 of a double pivot pusher pin 32. Pusher pin 32 is swingable in a counterclockwise direction on such brackets 30 via pivot pins 33 from the position shown in FIG. 1a. The upper end portion 31 is arcuately recessed to permit the counterclockwise rotation about pin 33 while the portion below such arcuately recessed portion is rectangular and abuts the bracket 21 which prevents the clockwise rotation. The lower end portion of pusher pin 32 is swingable about pivot pin 34 in a counterclockwise direction from the position shown to provide a double-acting pivot means as shown in FIG. 1b. Such action permits pusher pin 32 to transfer a tire from the tire piercing apparatus 10 to the discharge conveyor 13 and additionally allows the double pivoting of such pusher pin 32 in a counterclockwise direction to override the tire on such piercing apparatus 10 to permit the return of said mechanism to its starting position. In a similar manner, a pair of laterally extending supports 35 are connected to the other end portion of side brackets 19—19, which supports 35 pivotally support the upper end portion 37 of pusher pin 38. Pusher pin 38 is similarly pivotable in a counterclockwise direction as viewed in FIG. 1 but is not pivotable in a clockwise direction due to the arcuate recessed upper end portion of the end portion 37. Such pusher pin 38 cooperates with conveyor means 39 located immediately below said feed mechanism 11 to transfer a tire from such conveyor means 39 to the tire piercing apparatus 10. A hydrocheck device 24 (as shown in FIG. 1a) is connected to the cylinder 25 to slow down the loader or piston movement on its return stroke.

Tire piercing apparatus 10 includes a base having four vertically extending angle iron supports 40 which are connected at their lower ends via brackets 41 and at their upper ends via brackets 42. Closely adjacent the upper bracket 42 is a horizontally extending ring 43 which is secured by suitable means to the support frame of the tire piercing apparatus 10. In addition, tire piercing apparatus 10 has a tire receiving table at the upper end portion of the angle iron supports 40 comprising a plurality of V-shaped sections 44 (only four shown in FIG. 3) that are suitably mounted thereon. The radially extending edges of the respective sections 44 are recessed as at 45 to provide parallel guide ways between adjacent sections 44 for a purpose to be described. The V-sections 44 of the table act as guide means for the upper end portions of the awling assemblies to be described.

Mounted to bracket 41 is a pneumatic cylinder 46 having its piston rod 47 connected to an annular plate member 48 via a universal connection 50. Annular plate member 48 has a plurality of radially extending ways 51 which slidably receive guide shoes 52 (only one shown in FIG. 1a) for a purpose to be described.

Figure 3:
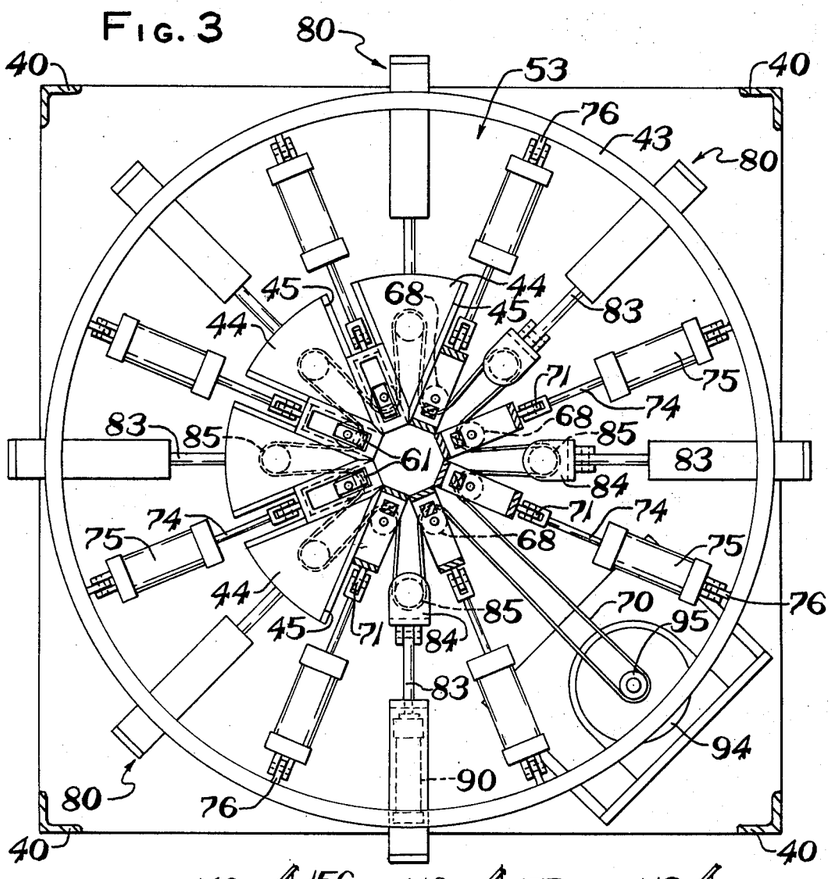
FIG. 3 is a cross-sectional view of the tire piercing apparatus taken along line 3—3 of FIG. 1; however showing V-shaped sector for a portion of the circumference of the apparatus to illustrate the guide means for the movable tire piercing means.

Mounted circumferentially around the vertically longitudinal center line of the tire piercing apparatus 10 are a plurality of tire clamping and piercing means 53. FIG. 3 discloses eight such means 53 to assure clarity of view; however, it is desirable to have at least twelve such units for the operation. Only one of such units 53 will be described since such units 53 are identical in construction and operation. Tire clamp and piercing means 53 has a rectangular shaped support member 54, which support member 54 has a recess 55 at its upper end portion, a guide bushing 56 at its lower end portion, and a bushing 57 closely adjacent the upper end portion thereof. Slidably received by guide bushings 56 and 57 is a longitudinally vertically extending tire clamp rod 58 that is pivotally connected at its lower end portion to the guide shoe 52 via pin 60. Tire clamp rod 58 has a laterally extending projection or awling dog 61 at its upper end portion, which dog 61 has a vertically extending bore 62 at its outermost end portion to receive a piercing member (to be described) when tire clamp rod 58 is at load position.

Secured to the side frame of rectangular shaped support member 54 is a combination pneumatic cylinder and rotating unit 63 which journals a rotatable vertically movable piston rod 65. The upper end portion of rotatable piston rod 65 is provided with a collet 66 which receives a piercing member 67 removably held thereby. The piercing member 67 is in line with the longitudinal center line of bore 62 on dog 61. The lower end portion of piston rod 65 has operatively connected thereto a pulley 68 which is rotatably driven by a belt 70. Such pneumatic cylinder and rotating units 63 are standard commercially available items, the details of which form no part of the invention, and will, therefore, not be described, it being sufficient to note that the piercing member 67 is rotated by rod 65 and is reciprocable in a vertical direction by the actuation of pneumatic cylinder 63. Mounted on the intermediate portion of rectangular shaped support member 54 is a bracket 71 which is pivotally connected via pin 72 to a U-shaped support 73, which is operatively connected to a piston rod 74. A pneumatic cylinder 75 has its cylinder end pivotally connected via a bracket 76 to the horizontal support ring 43 (see FIGS. 1a, 3 and 10). Pressurization of the head end of pneumatic cylinder 75 moves the tire clamping and piercing means 53 radially inwardly towards the longitudinal center line of tire piercing apparatus 10 with the rectangular shaped support 54, which is recessed, being guided radially along the parallel guide ways of recesses 45 (FIG. 3) and with the guide shoes 52 riding in ways 51.

Figures 7, 8, 9, 10:
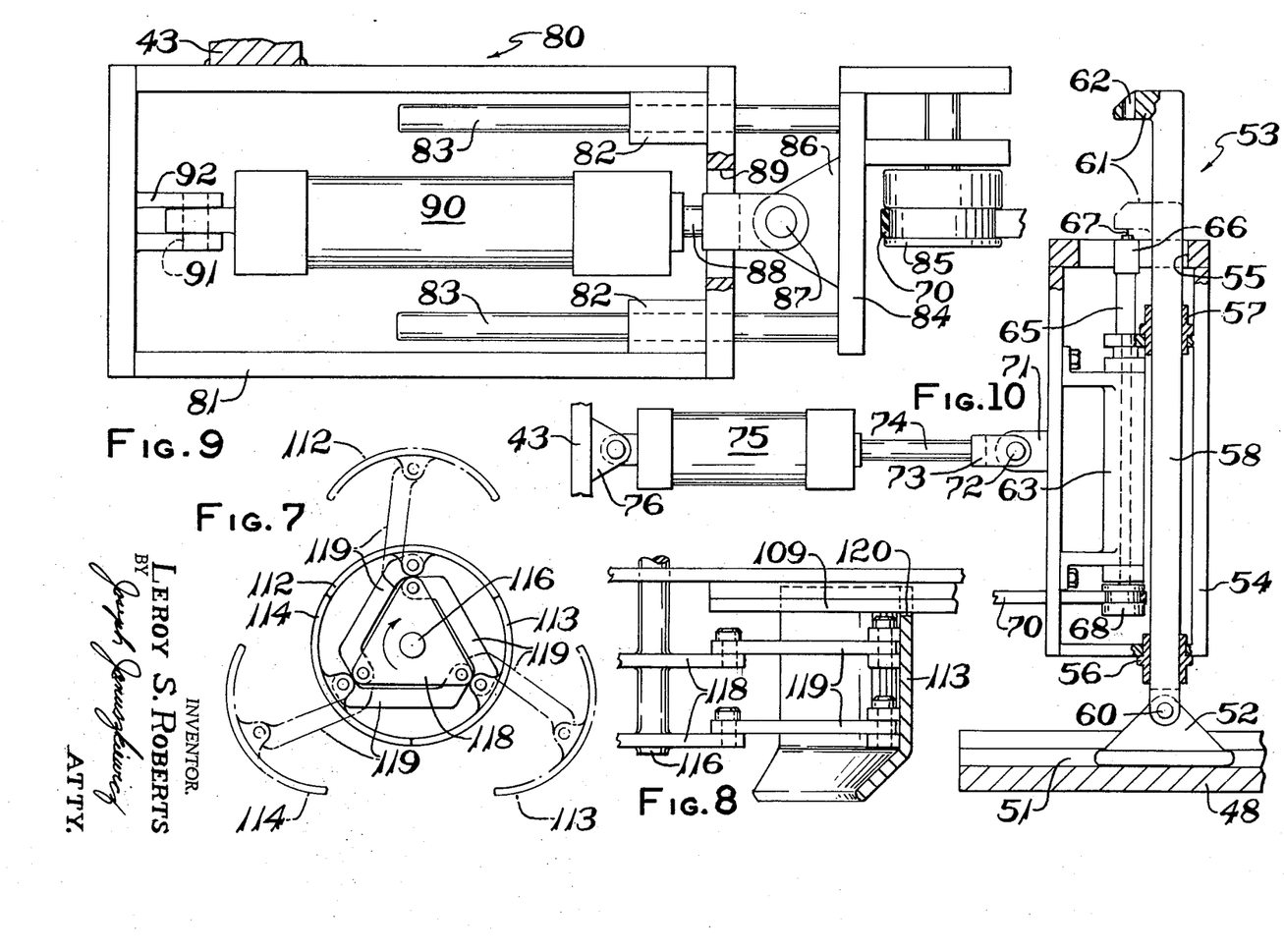
FIG. 7 is a fragmentary plan view of the centering means.
FIG. 8 is a fragmentary cross sectional view of the shoe for the sorter and centering means.
FIG. 9 is an enlarged fragmentary view of the belt tensioning means.
FIG. 10 is a fragmentary side elevational view of the tire clamping and piercing means showing a portion of the vertically movable plate member.

The belt tensioning means 80 (only one described) is a rectangularly shaped frame member 81 suitably connected to the horizontal support ring 43. Frame member 81 has a pair of spaced bushings 82 mounted on the forward portion thereof, which bushings 82 slidably guide rods 83 radially inwardly and outwardly toward the vertical longitudinal center line of the tire piercing apparatus 10. The one end portion of the guide rods 83 is connected to a bracket 84 which has rotably journalled thereon a guide pulley 85. Such guide pulley is frictionally engaged by belt 70 for a portion of its circumference. Bracket 84 is pivotally connected via a triangle shaped bracket 86 and pin 87 to the one end portion of a piston rod 88 of pneumatic cylinder 90. Such piston rod 88 extends through a recess 89 in the one end portion of the rectangularly shaped frame member 81. The head end of pneumatic cylinder 90 is pivotally connected via pin 91 and bracket 92 to the other end portion of the rectangular shaped frame 81. The rod end of pneumatic cylinder 90 is pressurized sufficiently to maintain the biasing action on the belt 70 to maintain a driving force on the pulley 68 of tire clamping and piercing means 53.

As shown in FIG. 3, tire piercing apparatus 10 has a drive motor 94 mounted thereon which motor 94 has a drive pulley 95 operatively connected to the belt 70. Belt 70 alternately engages the drive pulleys 68 of the tire clamping and piercing means 53 and the guide pulleys 85 of the belt tensioning means 80. Rotation of drive motor 94 imparts a driving action to the belt 70 which in turn rotates pulley 68 and the piercing members 67 while pneumatic cylinder 90 maintains a bias on guide pulley 85 so that regardless of the movement imparted to the tire clamping and piercing means 53 through the actuation of pneumatic cylinder 75, the same rotative force is imparted to the piercing members 67 regardless of the position assumed by such piercing means 53.

Figure 4:
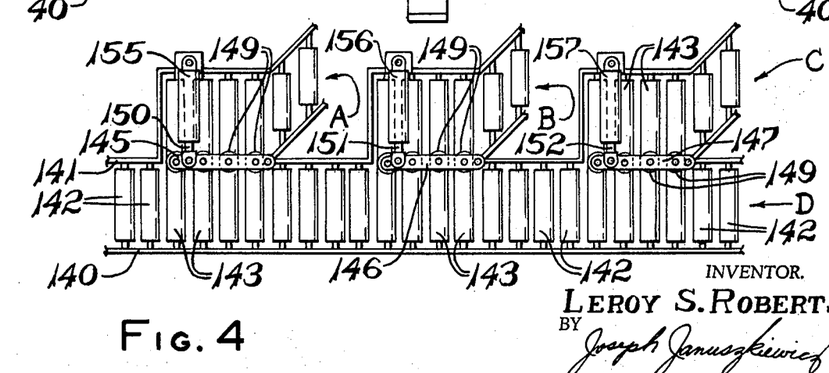
FIG. 4 is a schematic plan view of the conveyor sorting system.
Figure 5:
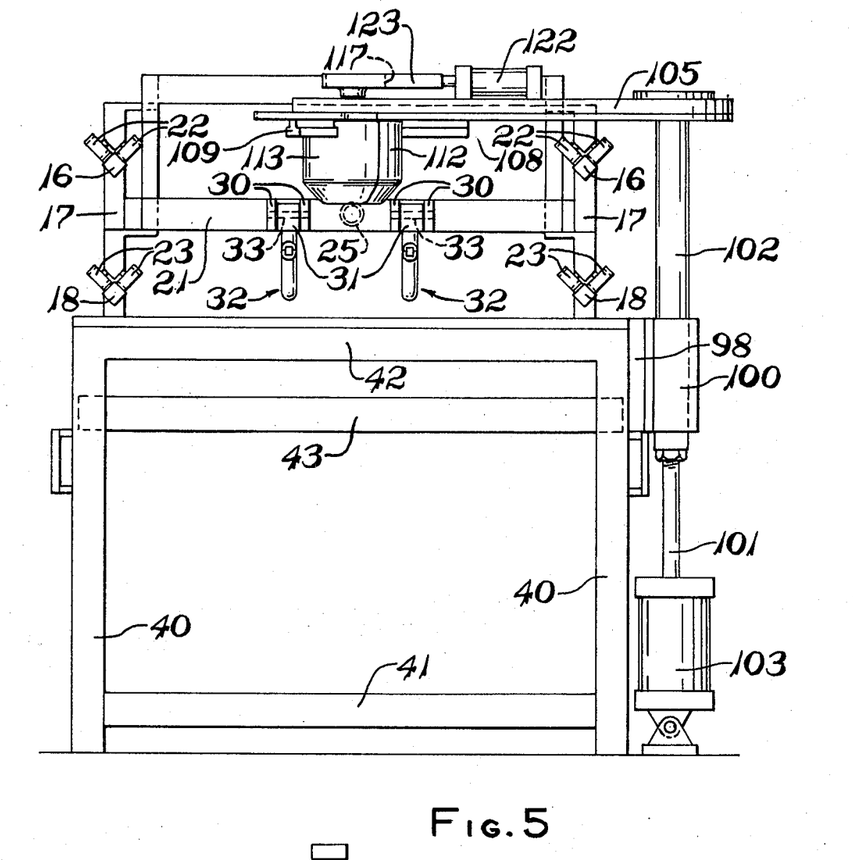
FIG. 5 is a side-elevational view of the apparatus showing the centering mechanism, bedplate and feed mechanism inlet conveyor.

Tire piercing apparatus 10 has secured to its side brackets 41 and 42 a pair of vertically extending supports 98 and 99 (FIG. 2). Extending transversely between and secured to supports 98 and 99 are bushing means 100 which guide the reciprocal movement of piston rod 101 and rod 102 (FIG. 5). Piston rod 101 is reciprocated in a vertical direction by pneumatic cylinder 103 mounted at the lower end portion of the tire piercing apparatus as seen in FIG. 4.

The upper end portion of rod 102 supports one end of a transversely extending support member 105 which is movable vertically up and down with the rod 102 and piston rod 101. The other end portion of support member 105 has a pair of radially extending support members 106 and 107. Such other end portion of support member 105 as well as support members 106 and 107 have mounted on the underneath portion thereof inverted T-shaped guides 108, 109 and 110, respectively (FIGS. 1a and 5). Mounted for guided reciprocal movement on such guides 108, 109 and 110 are arcuately shaped centering shoes 112, 113 and 114, respectively.

Such other end portion of support member 105 journals a vertically extending shaft 116 which has a spur gear 117 (FIG. 2) keyed thereto. Shaft 116 has keyed to its lower end portion a pair of spaced triangular shaped cams 118 (FIGS. 7 and 8), which cams 118 have pivotally connected to their respective apexes one end of a cam link member 119. The cam link members 119 have their other end pivotally connected to the respective centering shoes 112, 113 and 114. The central upper end portion of the respective centering shoes 112, 113 and 114 are suitably recessed to receive the inverted T-shaped portion of guides 108, 109 and 110, respectively. A pneumatic cylinder 122 is mounted on the support member 105 with its forwardly extending piston rod fixed to a rack 123 which meshes with the spur gear 117. Pressurization of the head end of pneumatic cylinder 122 operates to move the rack 123 forwardly (or downwardly as viewed in FIG. 2) which rotates spur gear 117 in a clockwise direction which thereby moves the respective centering shoes 112, 113 and 114 radially outwardly from the retracted position as shown in FIG. 7 to the position in phantom lines as the arcuately shaped recesses 120 slidably engage the square shaped lower end portion of the T-shaped guide members 108, 109 and 110, respectively. Pressurization of the rod end of pneumatic cylinder 122 operates to retract the respective centering shoes 112, 113 and 114.

Mounted on the side of rack 123 is a laterally extending bracket 124 which supports an adjustable actuator block 125. Mounted on the side portion of support member 105 is a limit switch holding bar 126 which supports a plurality of limit switches 127, 128 and 129 in alignment with the linearly movable bar 126. The limit switches 127–129, inclusive, measure the diameter of the tire being centered by the radially expanding shoes 112, 113 and 114 in cooperation with the adjustable limit switch bar 126. Such limit switches 127—129, inclusive, condition the sorting system to be described.

Figure 6:
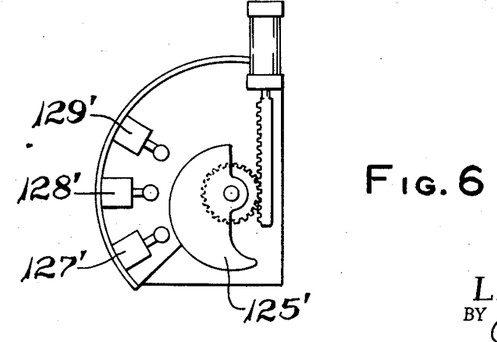
FIG. 6 is a fragmentary plan view with portions broken away to illustrate a modified sensing means for cooperation with the tire sensing means.

In lieu of such actuator block 125 and limit switches 127–129, inclusive, a cam 125' (FIG. 6) may be mounted or keyed to spur gear 117 to provide simultaneous rotation therewith. Cam 125' is adapted to actuate a plurality of limit switches 127', 128' and 129' mounted on a suitable support for actuating the sorting system to be described in the manner as switches 127–129, inclusive.

A discharge conveyor 13 is mounted on the one side of the tire piercing apparatus 10 opposite to the feed mechanism 11 to facilitate the removal of the tires after the dialyzing operation. Conveyor 13 (FIG. 2 and shown schematically in FIG. 4) comprises a pair of spaced frame members 140 and 141 which support a plurality of driven roller conveyors 142 alternately spaced with driven roller conveyors 143 of greater length. Frame member 141 is continuous except for three spaced gates 145, 146 and 147, which have their one end pivotally mounted thereon. Each gate has a plurality of vertically mounted rollers 149 to facilitate the movement of the tires and the sorting thereof. The other ends of gates 145, 146 and 147 are connected to piston rods 150, 151 and 152 of pneumatic cylinders 155, 156 and 157, respectively. Gates 145, 146 and 147 are normally open (gates shown closed in FIG. 4). Gate 145 is controlled by pneumatic cylinder 155 through the actuation of limit switch 127 or 127' which actuates a solenoid operated valve which directs compressed fluid to the head end of cylinder 155.

Since the gates 145, 146 and 147 are normally open, the movement of the actuator block 125 or cam 125' upon centering of the tire, assuming a minimum diameter of tire being gauged, will fail to contact the limit switch 127 and will accordingly fail to actuate the pneumatic cylinder 155 so that the gauged tire upon being discharged will be directed via conveyor 13 over roller conveyors 142 and 143 for deflection by gate 145 into chute A which is tire size W. The rollers 142 and 143 are driven to assure clearing the respective gates in preparation to the subsequent tire piercing and gauging operation. Assuming that the tire size was the next size greater than W, such as tire sixe X, the actuator block 125 or 125' would have contacted the limit switch 127 or 127', respectively, which in turn would energize the rod end of pneumatic cylinder 155 which would swing gate 145 in a clockwise direction to the position shown in FIG. 4 to thereby close the gate 145. Such action would permit the tires gauged by the tire centering device 12 to be directed via conveyor 13 over roller conveyors 142 and 143 past gate 145 and deflected by gate 146 into chute B which is tire size X. Assuming the tire size was the next size greater than X, such as tire size Y, the actuator blocks 125 would have contacted the limit switches 127 and 128 which in turn would energize the rod ends of pneumatic cylinders 155 and 156 which would swing gates 145 and 146 in a clockwise direction to the position shown in FIG. 4 to thereby close gates 145 and 146. Such action would permit the tires gauged by the tire centering device 12 to be directed via conveyor 13 over roller conveyors 142 and 143 into chute C. In the event that a tire being centered was the next size greater than Y, such as tire size Z, the actuator block 125 would have contacted the limit switches 127, 128 and 129 which in turn would energize the rod ends of pneumatic cylinders 155, 156 and 157 which would swing gates 145, 146 and 147 in a clockwise direction to the position shown in FIG. 4 thereby closing gates 145, 146 and 147. Such action would direct the gauged tire by centering device 12 to pass via conveyor 13 over roller conveyor 142 and 143 into chute D which is tire size Z.

OPERATION

Figure 11:
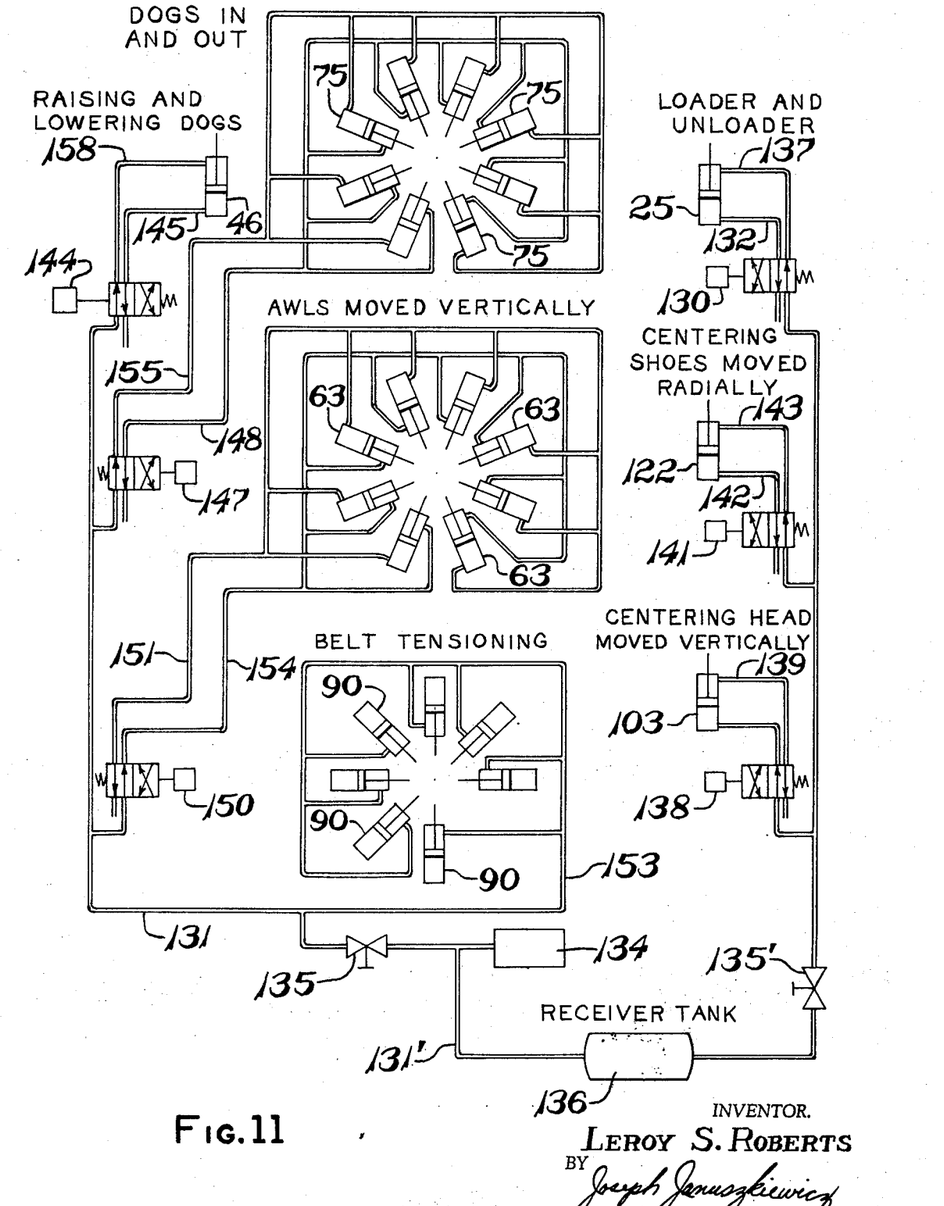
FIG. 11 is a schematic diagram of the pneumatic pressure actuating system for the tire piercing system.

In operating the apparatus, the cycle of operation is initiated manually or automatically by the arrival of a tire onto the conveyor means 39 and abutting a suitable tire stop means which positions the tire for the feeding operation. Such movement of the tire closes a set of normally open contacts on a limit switch thereby actuating a suitable electrical switch in a manner well known in the art to actuate solenoid operated valve 130 (FIG. 11)

which connects pressurized conduit 131' with conduit 132 to thereby pressurize the head end of pneumatic cylinder 25 which moves piston rod 27 rightwardly as viewed in FIGS. 1a and 2, whereby the pusher pins 38 move the tire onto the awling section of the tire piercing section 10. At the same time the pusher pins 32 on such feed mechanism 11 operate to remove or unload the last tire onto the discharge conveyor 13 which directs such tire into the proper chute as described above. The machine is pneumatically operated whereby a compressor 134 (FIG. 11) or some other constant pressure source supplies pressurized air through regulator valve 135 to conduits 131 and through conduit 131' to receiver tank 136. It is to be understood that suitable safety regulator and shut-off valves are provided to maintain the required pressure for the system. Through suitable timers and limit switches on the tire piercing apparatus 10, solenoid operated valve 130 is de-energized and receiver tank 136 is connected with conduit 137 which supplies compressed air to the rod end of pneumatic cylinder 25 whereby the piston rod 27 is retracted, which returns the pneumatic cylinder 25 to its initial position. It is to be understood that the stroke of cylinder 25 is adjustable. Since push pins 32 are freely swingable in a counterclockwise direction as viewed in FIG. 1a, such retraction of pneumatic cylinder 25 does not effect the positioning of the tire which has been delivered to the tire piercing apparatus 10. Solenoid operated valve 138 is then energized and supplies compressed air from receiver 136 to conduit 139 which pressurizes the rod end of pneumatic cylinder 103 which lowers the tire centering device 12 along with support member 105 such that the respective centering shoes 112, 113 and 114 are positioned within the tire which is to be dialyzed. Solenoid operated valve 141 is then energized which connects receiver 136 with conduit 142 which pressurizes the head end of pneumatic cylinder 122 which in turn moves the piston rod and rack 123 outwardly which action rotates the spur gear 117 in a clockwise direction (as viewed in FIG. 2) which in turn moves the respective centering shoes 112, 113 and 114 outwardly to center the tire which is positioned upon the tire piercing apparatus 10. Simultaneously with such centering operation, rack 123 carries with it actuator block 125 which makes contact with the appropriate limit switches 127–129, inclusive, in accordance with the size of tire being centered to thereby condition the sorting system as described in detail above. Solenoid operated valve 141 is then de-energized connecting the head end of pneumatic cylinder 122 to exhaust while connecting the rod end of pneumatic cylinder 122 with pressurized receiver 136 via conduit 143 thereby retracting the respective centering shoes. Thereafter solenoid operated valve 138 is de-energized connecting the head end of pneumatic cylinder 103 with the receiver 136 which raises the centering device 12 and the support member 105 to remove such centering device from the area of operation such as not to interfere with the dialyzing operation. Simultaneously with such action, solenoid operated valve 144 is energized which connects pressurized conduit 131 with branch conduit 145 which pressurizes the head end of pneumatic cylinder 46 which in turn raises the plate member 48 and all the tire clamping projections or awling dogs 61.

Thereafter, solenoid operated valve 147 is energized which connects pressurized conduit 131 with conduit 148 which pressurizes the rod end of pneumatic cylinders 75 (FIG. 10) which moves the tire clamping and piercing means 53 leftward as viewed in FIG. 10 or radially outwardly on the piercing apparatus 10 to thereby position the guide rods 58 of the respective tire clamping means 53 radially outwardly against the rim portion of the tire which has been centered. Solenoid operated valve 144 is then de-energized which connects the compressed air from conduit 131 to the rod end of pneumatic cylinder 46 via conduit 158 which thereby lowers the tire clamping dogs 61 such that the dogs 61 on the respective guide rods 58 engage the rim portion of the tire to be pierced and retains the sidewall flat on the table. Simultaneously with such action solenoid operated valve 150 is energized which connects pressurized conduit 131 with conduit 151 which supplies compressed air to the head end of pneumatic cylinders 63 which moves the respective piercing members 67 into piercing engagement with the sidewall portion of the tire being held by the clamping dogs 61. Since compressed air is supplied at all times via conduit 131 and branch conduit 153 to the rod end of pneumatic cylinders 90, a biasing action is exerted on the respective guide pulleys 85 which maintains a predetermined tension on the driven belt 70 which is being driven at a preselected constant speed by motor 94 to provide the rotative action to the piercing members 67.

The awls of the piercing members 67 pierce the tire to the preset depth providing uniform awl holes, requiring a minimum amount of force to pierce the tires. Thereafter, solenoid operated valve 150 is de-energized thereby communicating pressurized conduit 131 with conduit 154 which pressurizes the rod end of pneumatic cylinders 63 to retract the awls from the pierced tire and move such awls below the bedplate of the tire piercing apparatus 10. After the awls are lowered, the awling dogs or projections 61 are raised by the energization of solenoid 144 which connects conduit 131 with conduit 145 which pressurizes the head end of pneumatic cylinder 46 and thereby raises the annular plate member 48 which also raises the guide rods 58 and their respective awling dogs 61 to release the tire. Thereafter solenoid valve 147 is de-energized connecting pressurized conduit 131 with conduit 155 to pressurize the head end of pneumatic cylinders 75 which in turn moves the respective tire clamping and piercing means 53 radially inwardly. Solenoid valve 144 is then de-energized connecting the pressurized conduit 131 with the conduit 158 which operates to lower the awling dogs 61, the rods 58 and the plate member 48. As the awling dogs 61 move in and are retracted below the surface of the bedplate, the cycle is completed and the machine is ready for another tire.

Although the invention has been described with reference to one specific embodiment of the invention, it is to be understood that numerous modifications or alterations may be made therein without departing from the spirit and the scope of the invention as set forth in the appended claims.

I claim:

1. An apparatus to provide for the escape of gaseous substances from within the body of a pneumatic tire comprising, a frame having a horizontally disposed bedplate, a vertically movable tire centering device cooperative with said bedplate and the central opening of a tire to center a tire on said bedplate, said bedplate having a plurality of radially extending slots extending from the longitudinal center line thereof, a plurality of circumferentially spaced piercing units mounted on said frame below said bedplate, guide means on said frame operative to guide said piercing units radially toward and away from said longitudinal center line, each piercing unit having actuating means operatively connected thereto for moving said piercing unit radially on its guide means, each piercing unit having a piercing member and a clamp means separately movable in an axial direction parallel to said longitudinal center line for respectively piercing and clamping the sidewall of a tire; means mounted on said frame operatively connected to said clamp means selectively operable to move said clamp means in a vertical reciprocal direction, means operatively connected to each of said piercing members to move said piercing members selectively in an axial direction, rotary drive means operatively connected to each of said piercing members for rotating said piercing members at a preselected speed during movement of said piercing member.

2. An apparatus to provide passageways for the escape of gaseous materials from within the carcass of a pneumatic tire comprising a support frame having a horizontally disposed table for receiving a tire thereon; centering means cooperative with said table for centering a tire thereon; a plurality of radially movable members mounted on said support frame; and each of said members having a clamp means and a rotary piercing member mounted thereon operative to clamp the sidewall of a tire onto said table and pierce such sidewall to a controlled depth.

3. An apparatus to provide for the escape of gases from within the tire carcass comprising a support frame having a horizontally disposed table for receiving a tire thereon; centering means cooperative with said table for centering a tire thereon; a plurality of radially movable members mounted on said support frame; each of said members having a vertically movable clamping means and rotary piercing means thereon; actuating means operatively connected to said clamping means for moving all of said clamping means vertically upwardly and downwardly as a unit irrespective of the movement of said radially movable members to selectively clamp a tire onto said table; and each radially movable member having means for moving said rotary piercing means vertically upward to pierce a sidewall of a tire and downward to retract said piercing means.

4. An apparatus for providing vent openings in the sidewall of a pneumatic tire comprising a support frame having a horizontally disposed bedplate for receiving a pneumatic tire thereon, a plurality of circumferentially spaced slides mounted on said frame for radial movement, means operatively connected to said slides for moving said slides radially toward and away from the longitudinal center line of said bedplate, each slide having a clamping means and a piercing member movable therewith, first means operatively connected to each of said slides for moving said slides radially toward and away from each other, second means operatively connected to all said clamping means for moving said clamping means in a direction normal to said bedplate for clamping the sidewall of a tire onto said bedplate, and third means operatively connected to said piercing members for selectively moving said piercing members in a direction normal to said bedplate for piercing the sidewall of a tire held by said clamping means on said bedplate.

5. A tire piercing apparatus for providing vent openings in the sidewall of a pneumatic tire comprising a support frame having a horizontally disposed bedplate with a central bore therein and a horizontally disposed plate member; said bore having a vertically extending center line; a plurality of circumferentially spaced slide members mounted on said frame; each member having a clamping means and a rotary piercing member movable therewith; said clamping means having a lower portion slidably secured to said plate member, actuating means operatively connected to said plate member for moving said plate member in an axial direction for clamping the sidewall of a tire onto said bedplate; means operatively connected to each of said slide members for moving said slide members radially toward and away from said center line; means on each of said slide members operatively connected to each of said rotary piercing members for selectively moving said rotary members parallel to said center line for piercing the sidewall of a tire on said bedplate.

6. An apparatus for providing vent openings as set forth in claim 5 wherein centering means is operatively connected to said frame having a portion thereof movable along said longitudinal center line for centering a tire on said bedplate.

7. An apparatus as set forth in claim 6 wherein said drive means for said rotary piercing members comprises a belt operatively connected to each of said rotary piercing members, and tensioning means operatively connected to said belt for maintaining a predetermined tension on said belt in all positions of movement of said units.

8. An apparatus as set forth in claim 7 wherein said centering means comprises a plurality of movable shoes movable radially outwardly to engage the inner diameter portion of a tire for centering such tire on said bedplate.

9. A tire apparatus comprising a support frame having a horizontally disposed table for receiving a tire thereon; discharge conveyor means; a movable support means cooperable with said table for centering a tire thereon; said support means having gauging means movable therewith; a plurality of radially movable members mounted on said support frame; said member having clamping and rotary piercing means operative upon actuation to clamp the sidewall of a tire onto said table and pierce such sidewall to a controlled depth; and sensing means cooperative with said gauging means to operate said discharge conveyor means into a sorting operation.

10. A tire apparatus as set forth in claim 9 wherein said discharge conveyor means has power driven rollers for moving such gauged tires through said sorting operation.

11. A tire apparatus comprising a support frame having a horizontally disposed table for receiving a tire thereon; a plurality of chutes selectively operable to sort a tire into preselected sizes; means cooperative with said table for centering a tire thereon and preconditioning said chutes to receive a tire according to its size; a plurality of radially movable members mounted on said support frame; each of said members having a clamp means and a piercing member operative to clamp the sidewall of a tire onto said table and pierce such sidewall to a controlled depth; and a power driven discharge conveyor means operative to convey tires from said table into the proper one of said preconditioned chutes to thereby sort said tires.

12. An apparatus to provide for the escape of gases from within the tire carcass comprising a support frame having a horizontally disposed table for receiving a tire thereon; a plurality of chutes operable to receive tires; a discharge conveyor having a plurality of gates to divert tires into said chutes; means cooperative with said table for simultaneously centering a tire thereon and conditioning said gates for actuation upon discharge of said tire to sort such tires according to size; a plurality of radially movable members mounted on said support frame; each of said members having a vertically movable clamping means and rotary piercing means thereon; actuating means operatively connected to said clamping means for moving all of said clamping means vertically upwardly and downwardly as a unit irrespective of the movement of said radially movable members to selectively clamp a tire onto said table; and each radially movable member having means for moving said rotary piercing means vertically upward to pierce a sidewall of a tire and downward to retract said piercing means.

13. An apparatus to provide for the escape of gases from within a tire carcass comprising a support frame having a horizontally disposed table for receiving a tire thereon; a discharge conveyor operative to receive tires from said table; loader means operative to position a tire onto said table simultaneously with the discharging of a tire from said table onto said discharge conveyor; a plurality of storage means; said discharge conveyor having a sorter connecting said discharge conveyor selectively with said storage means; means cooperative with said table for centering a tire thereon and for actuating said sorter for selectively connecting said discharge conveyor with said sorter for directing such gauged centered tire into one of said storage means.

14. An apparatus to provide for the escape of gases from within a tire carcass comprising a support frame having a horizontally disposed table for receiving a tire thereon; a discharge conveyor operative to receive tires from said table; loader means operative to position a tire onto said table simultaneously with the discharging of a tire from said table onto said discharge conveyor; a plurality of storage means; said discharge conveyor having control means operable upon actuation to selectively direct a tire gauged into one of said storage means, means cooperative with said table for centering a tire thereon, gauging means operative in timed relationship with said centering means for actuating said control means to selectively sort tires according to their gauged size; clamp means operative to clamp the sidewall of a tire onto said table; and piercing means operatively connected to said table for piercing such tire sidewall in timed relationship to the clamping of the tire sidewall on said table.

References Cited

UNITED STATES PATENTS

| | | | |
|---|---|---|---|
| 2,937,749 | 5/1960 | Strzala | 209—88 |
| 2,812,583 | 11/1957 | Herzegh | 73—146 X |
| 3,062,269 | 11/1962 | Hurst | 156—421 X |

M. HENSON WOOD, Jr., *Primary Examiner.*

R. A. SCHACHER, *Assistant Examiner.*